(12) United States Patent
Conner (10) Patent No.: US 9,069,151 B2
(45) Date of Patent: Jun. 30, 2015

(54) COMPOSITE CABLE BREAKOUT ASSEMBLY

(71) Applicant: Mark Edward Conner, Granite Falls, NC (US)

(72) Inventor: Mark Edward Conner, Granite Falls, NC (US)

(73) Assignee: Corning Cable Systems LLC, Hickory, NC (US)

( * ) Notice: Subject to any disclaimer, the term of this patent is extended or adjusted under 35 U.S.C. 154(b) by 60 days.

(21) Appl. No.: 13/657,030

(22) Filed: Oct. 22, 2012

(65) Prior Publication Data

US 2013/0108227 A1 May 2, 2013

Related U.S. Application Data

(60) Provisional application No. 61/551,685, filed on Oct. 26, 2011.

(51) Int. Cl.
G02B 6/44 (2006.01)

(52) U.S. Cl.
CPC .................................. *G02B 6/4471* (2013.01)

(58) Field of Classification Search
None
See application file for complete search history.

(56) References Cited

U.S. PATENT DOCUMENTS

| | | | |
|---|---|---|---|
| 2,047,152 A | 7/1936 | Mitchell | |
| 2,853,775 A | 9/1958 | Drake | |
| D195,338 S | 6/1963 | Geisen | |
| 3,620,875 A | 11/1971 | Guglielmo, Sr. et al. | |
| D225,644 S | 12/1972 | Beach | |
| 3,845,552 A | 11/1974 | Waltz | |
| 3,879,575 A | 4/1975 | Dobbin et al. | |
| 3,912,854 A | 10/1975 | Thompson et al. | |
| 3,912,855 A | 10/1975 | Thompson et al. | |
| 4,085,286 A | 4/1978 | Horsma et al. | |
| 4,107,451 A | 8/1978 | Smith, Jr. et al. | |
| 4,152,539 A | 5/1979 | Charlebois et al. | |
| 4,213,018 A | 7/1980 | Piston | |
| 4,266,853 A | 5/1981 | Hutchins et al. | |

(Continued)

FOREIGN PATENT DOCUMENTS

| | | |
|---|---|---|
| DE | 1430906 A1 | 9/1969 |
| DE | 7111934 U | 6/1971 |

(Continued)

OTHER PUBLICATIONS

International Search Report for PCT/US06/44993 mailed Mar. 29, 2007, 2 pages.

(Continued)

*Primary Examiner* — Sung Pak (74) *Attorney, Agent, or Firm* — Brad Christopher Rametta (57) ABSTRACT

A composite cable breakout assembly is disclosed. The assembly includes an enclosure for receiving a composite cable having a fiber optic cable with at least one optical fiber and an electrical power cable with at least one electrical conductor. The enclosure has at least one port providing passage to the exterior of the enclosure. The at least one optical fiber is terminated by a fiber optic connector and the at least one electrical conductor is terminated by an electrical connector. Alternatively, the at least one optical fiber and the at least one electrical conductor may be terminated by a composite optical/electrical connector. The fiber optic cable and the electrical power cable route to the at least one port enabling connection external to the enclosure for extension of optical signal and electrical power to components external to the enclosure.

21 Claims, 4 Drawing Sheets

(56) References Cited

U.S. PATENT DOCUMENTS

| | | | |
|---|---|---|---|
| 4,322,573 | A | 3/1982 | Charlebois |
| 4,343,844 | A | 8/1982 | Thayer et al. |
| 4,360,268 | A | 11/1982 | Zucker et al. |
| 4,405,083 | A | 9/1983 | Charlebois et al. |
| 4,413,881 | A | 11/1983 | Kovats |
| 4,467,137 | A | 8/1984 | Jonathan et al. |
| 4,475,935 | A | 10/1984 | Tanaka et al. |
| 4,481,380 | A | 11/1984 | Wood et al. |
| 4,490,315 | A | 12/1984 | Charlebois et al. |
| 4,512,628 | A | 4/1985 | Anderton |
| 4,528,150 | A | 7/1985 | Charlebois et al. |
| 4,528,419 | A | 7/1985 | Charlebois et al. |
| 4,549,039 | A | 10/1985 | Charlebois et al. |
| 4,550,220 | A | 10/1985 | Kitchens |
| 4,553,812 | A | 11/1985 | Kojiro et al. |
| 4,556,281 | A | 12/1985 | Anderton |
| 4,570,032 | A | 2/1986 | Charlebois et al. |
| 4,581,480 | A | 4/1986 | Charlebois |
| 4,589,939 | A | 5/1986 | Mohebban et al. |
| 4,591,330 | A | 5/1986 | Charlebois et al. |
| 4,592,721 | A | 6/1986 | Charlebois et al. |
| 4,595,256 | A | 6/1986 | Guazzo |
| 4,602,840 | A | 7/1986 | Romatzick |
| 4,609,773 | A | 9/1986 | Brown et al. |
| 4,610,738 | A | 9/1986 | Jervis |
| 4,625,073 | A | 11/1986 | Breesch et al. |
| 4,629,597 | A | 12/1986 | Charlebois et al. |
| 4,648,606 | A | 3/1987 | Brown et al. |
| 4,648,919 | A | 3/1987 | Diaz et al. |
| 4,652,072 | A | 3/1987 | Arasi, Jr. |
| 4,654,474 | A | 3/1987 | Charlebois et al. |
| 4,665,279 | A | 5/1987 | Ruschkofski et al. |
| 4,666,537 | A | 5/1987 | Dienes |
| 4,669,802 | A | 6/1987 | Schaffer |
| 4,670,069 | A | 6/1987 | Debbaut et al. |
| 4,670,980 | A | 6/1987 | Charlebois et al. |
| 4,673,242 | A | 6/1987 | Logan et al. |
| 4,678,866 | A | 7/1987 | Charlebois |
| 4,684,764 | A | 8/1987 | Luzzi et al. |
| 4,685,799 | A | 8/1987 | Brininstool |
| 4,701,010 | A | 10/1987 | Roberts |
| 4,701,574 | A | 10/1987 | Shimirak et al. |
| 4,702,551 | A | 10/1987 | Coulombe |
| 4,704,499 | A | 11/1987 | Faust |
| 4,708,476 | A | 11/1987 | So et al. |
| 4,717,231 | A | 1/1988 | Dewez et al. |
| 4,721,830 | A | 1/1988 | Dagan et al. |
| 4,725,035 | A | 2/1988 | Charlebois et al. |
| 4,732,628 | A | 3/1988 | Dienes |
| 4,736,071 | A | 4/1988 | Hawkins et al. |
| 4,742,541 | A | 5/1988 | Cwirzen et al. |
| 4,747,020 | A | 5/1988 | Brickley et al. |
| 4,761,052 | A | 8/1988 | Buekers et al. |
| 4,764,232 | A | 8/1988 | Hunter |
| 4,785,376 | A | 11/1988 | Dively |
| 4,792,203 | A | 12/1988 | Nelson et al. |
| 4,805,979 | A | 2/1989 | Bossard et al. |
| 4,818,824 | A | 4/1989 | Dixit et al. |
| 4,822,434 | A | 4/1989 | Sawaki et al. |
| 4,834,479 | A | 5/1989 | Adl |
| 4,850,014 | A | 7/1989 | Gillis et al. |
| 4,859,809 | A | 8/1989 | Jervis |
| 4,867,524 | A | 9/1989 | Courtney et al. |
| 4,875,952 | A | 10/1989 | Mullin et al. |
| 4,882,647 | A | 11/1989 | Collins |
| 4,884,863 | A | 12/1989 | Throckmorton |
| 4,913,512 | A | 4/1990 | Anderton |
| 4,917,615 | A | 4/1990 | Franks, Jr. |
| 4,927,227 | A | 5/1990 | Bensel, III et al. |
| 4,932,742 | A | 6/1990 | Tohme |
| 4,952,798 | A | 8/1990 | Graham et al. |
| 4,958,900 | A | 9/1990 | Ortiz, Jr. |
| 4,960,317 | A | 10/1990 | Briggs et al. |
| 4,961,623 | A | 10/1990 | Midkiff et al. |
| 4,963,698 | A | 10/1990 | Chang et al. |
| 4,976,510 | A * | 12/1990 | Davila et al. .................. 385/135 |
| 4,982,083 | A | 1/1991 | Graham et al. |
| 4,986,762 | A | 1/1991 | Keith |
| D314,759 | S | 2/1991 | Collins et al. |
| 4,989,939 | A | 2/1991 | Cox et al. |
| 4,995,688 | A | 2/1991 | Anton et al. |
| 5,004,315 | A | 4/1991 | Miyazaki |
| 5,011,256 | A | 4/1991 | Johnson et al. |
| D318,653 | S | 7/1991 | Nieves et al. |
| 5,029,958 | A | 7/1991 | Hodge et al. |
| 5,031,984 | A | 7/1991 | Eide et al. |
| 5,042,901 | A | 8/1991 | Merriken et al. |
| 5,046,811 | A | 9/1991 | Jung et al. |
| 5,050,949 | A | 9/1991 | DiGiovanni et al. |
| 5,052,773 | A | 10/1991 | Noon et al. |
| 5,052,775 | A | 10/1991 | Bossard et al. |
| 5,054,868 | A | 10/1991 | Hoban et al. |
| 5,066,095 | A | 11/1991 | Dekeyser et al. |
| 5,068,890 | A | 11/1991 | Nilssen .......................... 379/90 |
| 5,074,808 | A | 12/1991 | Beamenderfer et al. |
| 5,076,688 | A | 12/1991 | Bowen et al. |
| 5,077,815 | A | 12/1991 | Yoshizawa et al. |
| 5,091,987 | A | 2/1992 | MacCulloch et al. |
| 5,093,885 | A | 3/1992 | Anton |
| 5,097,529 | A | 3/1992 | Cobb et al. |
| 5,099,088 | A | 3/1992 | Usami et al. |
| 5,100,221 | A | 3/1992 | Carney et al. |
| 5,109,458 | A | 4/1992 | Dixit et al. |
| 5,115,105 | A | 5/1992 | Gallusser et al. |
| 5,121,458 | A | 6/1992 | Nilsson et al. |
| 5,122,069 | A | 6/1992 | Brownlie et al. |
| 5,125,060 | A | 6/1992 | Edmundson |
| 5,127,082 | A | 6/1992 | Below et al. |
| 5,129,030 | A | 7/1992 | Petrunia |
| 5,133,038 | A | 7/1992 | Zipper |
| 5,133,039 | A | 7/1992 | Dixit |
| 5,142,606 | A | 8/1992 | Carney et al. |
| 5,155,303 | A | 10/1992 | Bensel, III et al. |
| 5,179,618 | A | 1/1993 | Anton |
| 5,185,844 | A | 2/1993 | Bensel, III et al. |
| 5,185,845 | A | 2/1993 | Jones |
| 5,194,692 | A | 3/1993 | Gallusser et al. |
| 5,204,929 | A | 4/1993 | Machall et al. |
| 5,209,958 | A | 5/1993 | Katsaros et al. |
| 5,210,812 | A | 5/1993 | Nilsson et al. |
| 5,212,761 | A | 5/1993 | Petrunia |
| 5,214,735 | A | 5/1993 | Henneberger et al. |
| 5,217,808 | A | 6/1993 | Cobb |
| D337,313 | S | 7/1993 | Davis |
| 5,231,687 | A | 7/1993 | Handley |
| 5,235,665 | A | 8/1993 | Marchesi et al. |
| 5,241,611 | A | 8/1993 | Gould |
| 5,245,151 | A | 9/1993 | Chamberlain et al. |
| 5,247,135 | A | 9/1993 | Rebers et al. |
| 5,259,047 | A | 11/1993 | Morrison et al. |
| 5,260,957 | A | 11/1993 | Hakimi et al. |
| 5,267,122 | A | 11/1993 | Glover et al. |
| 5,308,954 | A | 5/1994 | Manock et al. |
| 5,322,973 | A | 6/1994 | Dagan |
| 5,335,408 | A | 8/1994 | Cobb |
| 5,347,089 | A | 9/1994 | Barrat et al. |
| 5,353,367 | A | 10/1994 | Czosnowski et al. |
| 5,357,565 | A | 10/1994 | Butler, III et al. |
| 5,363,465 | A | 11/1994 | Korkowski et al. |
| 5,363,467 | A | 11/1994 | Keith |
| 5,367,598 | A | 11/1994 | Devenish, III et al. |
| 5,376,196 | A | 12/1994 | Grajewski et al. |
| 5,378,853 | A | 1/1995 | Clouet et al. |
| 5,381,501 | A | 1/1995 | Cardinal et al. |
| 5,386,490 | A | 1/1995 | Pan et al. |
| 5,394,502 | A | 2/1995 | Caron |
| 5,402,515 | A | 3/1995 | Vidacovich et al. |
| 5,410,105 | A | 4/1995 | Tahara et al. |
| RE34,955 | E | 5/1995 | Anton et al. |
| 5,418,874 | A | 5/1995 | Carlisle et al. |
| 5,420,958 | A | 5/1995 | Henson et al. |
| 5,425,121 | A | 6/1995 | Cooke et al. |
| RE34,995 | E | 7/1995 | Domenig |
| 5,432,875 | A | 7/1995 | Korkowski et al. |

(56) References Cited

U.S. PATENT DOCUMENTS

| | | |
|---|---|---|
| 5,440,655 A | 8/1995 | Kaplow et al. |
| 5,440,665 A | 8/1995 | Ray et al. |
| 5,442,726 A | 8/1995 | Howard et al. |
| 5,446,822 A | 8/1995 | Keith |
| 5,446,823 A | 8/1995 | Bingham et al. |
| 5,450,517 A | 9/1995 | Essert |
| 5,450,518 A | 9/1995 | Burek et al. |
| 5,475,781 A | 12/1995 | Chang et al. |
| 5,481,639 A | 1/1996 | Cobb et al. |
| 5,491,766 A | 2/1996 | Huynh et al. |
| 5,495,549 A | 2/1996 | Schneider et al. |
| 5,509,099 A | 4/1996 | Hermsen et al. |
| 5,509,202 A | 4/1996 | Abdow |
| 5,517,592 A | 5/1996 | Grajewski et al. |
| 5,525,756 A | 6/1996 | Mullaney et al. |
| 5,528,718 A | 6/1996 | Ray et al. |
| 5,553,186 A | 9/1996 | Allen |
| D377,339 S | 1/1997 | Beruscha et al. |
| 5,598,499 A | 1/1997 | Burek et al. |
| 5,623,542 A | 4/1997 | Schneider et al. |
| 5,633,973 A | 5/1997 | Vincent et al. |
| 5,638,481 A | 6/1997 | Arnett |
| 5,640,482 A | 6/1997 | Barry et al. |
| 5,644,671 A | 7/1997 | Goetter et al. |
| 5,645,449 A | 7/1997 | Sabo |
| 5,657,413 A | 8/1997 | Ray et al. |
| 5,659,650 A | 8/1997 | Arnett |
| 5,666,453 A | 9/1997 | Dannenmann |
| 5,684,911 A | 11/1997 | Burgett |
| 5,689,607 A | 11/1997 | Vincent et al. |
| 5,696,864 A | 12/1997 | Smith et al. |
| 5,701,380 A | 12/1997 | Larson et al. |
| 5,708,742 A | 1/1998 | Beun et al. |
| 5,708,753 A | 1/1998 | Frigo et al. |
| 5,732,180 A | 3/1998 | Kaplan |
| 5,734,776 A | 3/1998 | Puetz |
| 5,741,158 A | 4/1998 | Reed et al. |
| 5,745,633 A | 4/1998 | Giebel et al. |
| 5,754,724 A | 5/1998 | Peterson et al. |
| 5,757,997 A | 5/1998 | Birrell et al. |
| 5,758,003 A | 5/1998 | Wheeler et al. |
| 5,767,448 A | 6/1998 | Dong |
| 5,778,122 A | 7/1998 | Giebel et al. |
| 5,781,678 A | 7/1998 | Sano et al. |
| D399,190 S | 10/1998 | Dale et al. |
| 5,823,646 A | 10/1998 | Arizpe et al. |
| 5,825,963 A | 10/1998 | Burgett |
| 5,825,964 A | 10/1998 | Goetter et al. |
| 5,828,807 A | 10/1998 | Tucker et al. |
| D401,568 S | 11/1998 | Alden et al. |
| 5,861,575 A | 1/1999 | Broussard |
| 5,867,621 A | 2/1999 | Luther et al. |
| 5,881,200 A | 3/1999 | Burt |
| 5,892,870 A | 4/1999 | Fingler et al. |
| 5,894,540 A | 4/1999 | Drewing |
| 5,896,486 A | 4/1999 | Burek et al. |
| 5,898,813 A | 4/1999 | Beier |
| 5,903,698 A | 5/1999 | Poremba et al. |
| 5,907,653 A | 5/1999 | Burek et al. |
| 5,914,846 A | 6/1999 | Smith et al. |
| 5,917,648 A | 6/1999 | Harker |
| 5,937,121 A | 8/1999 | Ott et al. |
| 5,945,633 A | 8/1999 | Ott et al. |
| 5,946,440 A | 8/1999 | Puetz |
| 5,956,449 A | 9/1999 | Otani et al. |
| D415,118 S | 10/1999 | Stanush et al. |
| 5,969,294 A | 10/1999 | Eberle et al. |
| 5,975,769 A | 11/1999 | Larson et al. |
| 5,987,203 A | 11/1999 | Abel et al. |
| 5,997,186 A | 12/1999 | Huynh et al. |
| RE36,592 E | 2/2000 | Giebel et al. |
| 6,037,544 A | 3/2000 | Lee et al. |
| D422,564 S | 4/2000 | Arizpe |
| 6,049,413 A | 4/2000 | Taylor et al. |
| 6,053,054 A | 4/2000 | Wusterbarth et al. |
| D424,598 S | 5/2000 | Simioni |
| 6,061,492 A | 5/2000 | Strause et al. |
| 6,061,870 A | 5/2000 | Dodge et al. |
| 6,064,791 A | 5/2000 | Crawford et al. |
| 6,086,263 A | 7/2000 | Selli et al. |
| 6,104,846 A | 8/2000 | Hodgson et al. |
| 6,122,420 A | 9/2000 | Satoh |
| RE36,952 E | 11/2000 | Zagar et al. |
| 6,160,946 A | 12/2000 | Thompson et al. |
| 6,167,183 A * | 12/2000 | Swain ......................... 385/135 |
| RE37,028 E | 1/2001 | Cooke et al. |
| 6,184,470 B1 | 2/2001 | Froehlich et al. |
| 6,195,494 B1 | 2/2001 | Abbott et al. |
| 6,198,866 B1 | 3/2001 | Nikolaevich |
| 6,206,583 B1 | 3/2001 | Hishikawa et al. |
| 6,208,796 B1 | 3/2001 | Williams Vigliaturo |
| 6,215,930 B1 | 4/2001 | Estes et al. |
| 6,215,939 B1 | 4/2001 | Cloud |
| 6,218,620 B1 | 4/2001 | Michel |
| 6,255,584 B1 | 7/2001 | Renaud |
| 6,259,024 B1 | 7/2001 | Daoud |
| 6,259,851 B1 | 7/2001 | Daoud |
| 6,263,141 B1 | 7/2001 | Smith |
| 6,275,641 B1 | 8/2001 | Daoud |
| 6,278,829 B1 | 8/2001 | BuAbbud et al. |
| 6,292,614 B1 | 9/2001 | Smith et al. |
| D449,824 S | 10/2001 | Higa et al. |
| 6,300,562 B1 | 10/2001 | Daoud |
| 6,343,950 B1 | 2/2002 | Eginton et al. |
| 6,353,697 B1 | 3/2002 | Daoud |
| 6,359,228 B1 | 3/2002 | Strause et al. |
| 6,363,200 B1 | 3/2002 | Thompson et al. |
| 6,369,883 B1 | 4/2002 | Clark |
| 6,376,774 B1 | 4/2002 | Oh et al. |
| 6,389,213 B1 | 5/2002 | Quesnel |
| 6,389,214 B1 | 5/2002 | Smith et al. |
| 6,407,338 B1 | 6/2002 | Smith |
| 6,417,453 B1 | 7/2002 | Lapp et al. |
| 6,418,262 B1 | 7/2002 | Puetz et al. |
| 6,418,266 B1 | 7/2002 | Vitantonio |
| 6,424,781 B1 | 7/2002 | Puetz et al. |
| 6,427,035 B1 | 7/2002 | Mahony |
| 6,435,727 B1 | 8/2002 | Fingler et al. |
| 6,438,310 B1 | 8/2002 | Lance et al. |
| 6,439,777 B1 | 8/2002 | Harrison et al. |
| 6,439,779 B1 | 8/2002 | Hafer |
| 6,441,944 B1 | 8/2002 | Kim et al. |
| 6,453,106 B1 | 9/2002 | Glaser et al. |
| 6,454,464 B1 | 9/2002 | Nolan |
| 6,466,725 B2 | 10/2002 | Battey et al. |
| 6,487,336 B1 | 11/2002 | Yao |
| 6,493,500 B1 | 12/2002 | Oh et al. |
| 6,508,593 B1 | 1/2003 | Farnsworth et al. |
| 6,533,472 B1 | 3/2003 | Dinh et al. |
| 6,535,579 B1 | 3/2003 | Blake et al. |
| 6,535,682 B1 | 3/2003 | Puetz et al. |
| 6,539,160 B2 | 3/2003 | Battey et al. |
| 6,542,688 B1 | 4/2003 | Battey et al. |
| 6,556,763 B1 | 4/2003 | Puetz et al. |
| 6,565,261 B1 | 5/2003 | Uchiyama et al. |
| 6,577,801 B2 | 6/2003 | Broderick et al. |
| 6,582,132 B1 | 6/2003 | Farnsworth et al. |
| 6,583,867 B1 | 6/2003 | Jennings et al. |
| 6,589,014 B1 | 7/2003 | Hawryluk et al. |
| 6,612,515 B1 | 9/2003 | Tinucci et al. |
| 6,614,665 B2 | 9/2003 | Witty et al. |
| 6,619,697 B2 | 9/2003 | Griffioen et al. |
| 6,628,870 B2 | 9/2003 | Yamaguchi |
| 6,631,237 B2 | 10/2003 | Knudsen et al. |
| D482,667 S | 11/2003 | Yu |
| 6,648,520 B2 | 11/2003 | McDonald et al. |
| 6,650,458 B1 | 11/2003 | Prosyk et al. |
| 6,652,295 B1 | 11/2003 | Glass et al. |
| 6,655,016 B2 | 12/2003 | Renaud |
| 6,661,961 B1 | 12/2003 | Allen et al. |
| 6,668,127 B1 | 12/2003 | Mahony |
| 6,678,457 B2 | 1/2004 | Kim et al. |
| 6,706,968 B2 | 3/2004 | Yaworski et al. |
| 6,710,366 B1 | 3/2004 | Lee et al. |

(56) References Cited

U.S. PATENT DOCUMENTS

| | | | |
|---|---|---|---|
| 6,711,337 B2 | 3/2004 | Hodge et al. |
| 6,711,340 B2 | 3/2004 | Dickson |
| 6,721,484 B1 | 4/2004 | Blankenship et al. |
| 6,721,507 B2 | 4/2004 | Iwata et al. |
| 6,744,962 B2 | 6/2004 | Allerellie |
| 6,757,308 B1 | 6/2004 | Eldring et al. |
| 6,760,531 B1 | 7/2004 | Solheid et al. |
| 6,764,220 B2 | 7/2004 | Griffiths et al. |
| 6,766,094 B2 | 7/2004 | Smith et al. |
| 6,775,456 B2 | 8/2004 | Matsuura |
| 6,778,752 B2 | 8/2004 | Laporte et al. |
| 6,782,209 B2 | 8/2004 | Copeland et al. |
| 6,786,652 B2 | 9/2004 | Marquez et al. |
| 6,792,191 B1 | 9/2004 | Clapp, Jr. et al. |
| 6,795,182 B2 | 9/2004 | Rakuljic et al. |
| 6,795,552 B1 | 9/2004 | Stanush et al. |
| 6,802,512 B2 | 10/2004 | Muller et al. |
| 6,804,352 B2 | 10/2004 | Miller et al. |
| 6,810,194 B2 | 10/2004 | Griffiths et al. |
| 6,815,612 B2 | 11/2004 | Bloodworth et al. |
| 6,819,842 B1 | 11/2004 | Vogel et al. |
| 6,824,312 B2 | 11/2004 | McClellan et al. |
| 6,856,747 B2 | 2/2005 | Cloud et al. |
| 6,856,748 B1 | 2/2005 | Elkins, II et al. |
| 6,861,584 B2 | 3/2005 | Hutchin et al. |
| 6,863,446 B2 | 3/2005 | Ngo |
| 6,866,541 B2 | 3/2005 | Barker et al. |
| 6,873,868 B2 | 3/2005 | Furnish |
| 6,875,926 B2 | 4/2005 | Buekers et al. |
| 6,880,219 B2 | 4/2005 | Griffioen et al. |
| 6,880,986 B2 | 4/2005 | Mynatt et al. |
| 6,901,200 B2 | 5/2005 | Schray |
| 6,916,199 B2 | 7/2005 | Follingstad |
| 6,918,786 B2 | 7/2005 | Barker et al. |
| 6,920,274 B2 | 7/2005 | Rapp et al. |
| 6,926,449 B1 | 8/2005 | Keenum et al. |
| 6,934,433 B2 | 8/2005 | Miyata et al. |
| 6,940,018 B1 | 9/2005 | Dewhirst |
| 6,968,107 B2 | 11/2005 | Belardi et al. |
| D512,697 S | 12/2005 | Enns et al. |
| 6,980,725 B1 | 12/2005 | Swieconek |
| 6,981,893 B2 | 1/2006 | Barker et al. |
| 6,983,095 B2 | 1/2006 | Reagan et al. |
| 7,006,739 B2 | 2/2006 | Elkins, II et al. |
| 7,013,074 B2 | 3/2006 | Battey et al. |
| 7,016,592 B2 | 3/2006 | Elkins, II et al. |
| 7,054,513 B2 | 5/2006 | Herz et al. |
| 7,088,899 B2 | 8/2006 | Reagan et al. |
| 7,094,095 B1 | 8/2006 | Caveney |
| 7,103,255 B2 | 9/2006 | Reagan et al. |
| 7,113,686 B2 | 9/2006 | Bellekens et al. |
| 7,120,347 B2 | 10/2006 | Blackwell, Jr. et al. |
| 7,130,519 B2 * | 10/2006 | Grubish et al. ............ 385/135 |
| 7,139,461 B2 | 11/2006 | Puetz et al. |
| 7,142,763 B2 | 11/2006 | Frohlich et al. |
| 7,142,764 B2 | 11/2006 | Allen et al. |
| 7,149,398 B2 | 12/2006 | Solheid et al. |
| 7,171,100 B2 | 1/2007 | Solheid et al. |
| 7,179,119 B2 | 2/2007 | Follingstad |
| 7,190,874 B1 | 3/2007 | Barth et al. |
| 7,200,317 B2 | 4/2007 | Reagan et al. |
| D543,513 S | 5/2007 | Allen et al. |
| 7,218,827 B2 | 5/2007 | Vongseng et al. |
| 7,218,828 B2 | 5/2007 | Feustel et al. |
| 7,220,145 B2 | 5/2007 | Denovich et al. |
| 7,221,832 B2 | 5/2007 | Tinucci |
| 7,239,789 B2 | 7/2007 | Grubish et al. |
| 7,244,144 B2 | 7/2007 | Follingstad |
| 7,257,223 B2 | 8/2007 | Sajadi et al. |
| 7,260,301 B2 | 8/2007 | Barth et al. |
| 7,274,850 B2 | 9/2007 | Wittmeier et al. |
| 7,277,620 B2 | 10/2007 | Vongseng et al. |
| D556,145 S | 11/2007 | Williams et al. |
| 7,292,763 B2 | 11/2007 | Smith et al. |
| 7,302,152 B2 | 11/2007 | Luther et al. |
| D560,170 S | 1/2008 | Ni |
| 7,327,926 B2 | 2/2008 | Barth et al. |
| 7,330,625 B2 | 2/2008 | Barth |
| 7,333,706 B2 | 2/2008 | Parikh et al. |
| 7,333,707 B2 | 2/2008 | Puetz et al. |
| 7,333,708 B2 | 2/2008 | Blackwell, Jr. et al. |
| 7,343,078 B2 | 3/2008 | Spisany et al. |
| 7,349,616 B1 | 3/2008 | Castonguay et al. |
| 7,351,909 B1 | 4/2008 | Harwood et al. |
| 7,362,925 B2 | 4/2008 | Miyata et al. |
| 7,397,997 B2 | 7/2008 | Ferris et al. |
| 7,400,816 B2 | 7/2008 | Reagan et al. |
| 7,433,566 B2 | 10/2008 | Bookbinder et al. |
| 7,450,807 B2 | 11/2008 | Bickham et al. |
| 7,489,849 B2 | 2/2009 | Reagan et al. |
| 7,499,622 B2 | 3/2009 | Castonguay et al. |
| 7,505,660 B2 | 3/2009 | Bickham et al. |
| D597,403 S | 8/2009 | Ho et al. |
| 7,668,431 B2 | 2/2010 | Cox et al. |
| 7,702,208 B2 | 4/2010 | Mudd et al. |
| 7,751,675 B2 | 7/2010 | Holmberg et al. |
| 8,020,259 B2 | 9/2011 | Ho et al. |
| 8,107,785 B2 | 1/2012 | Berglund et al. |
| 8,135,256 B2 * | 3/2012 | Solheid et al. ............ 385/135 |
| 2001/0052451 A1 | 12/2001 | Ruoss et al. |
| 2002/0051616 A1 | 5/2002 | Battey et al. |
| 2002/0061170 A1 | 5/2002 | Wu et al. |
| 2002/0079697 A1 | 6/2002 | Griffioen et al. |
| 2002/0146229 A1 | 10/2002 | Roberts |
| 2002/0181925 A1 | 12/2002 | Hodge et al. |
| 2003/0010519 A1 | 1/2003 | Pieck |
| 2003/0063869 A1 | 4/2003 | Elkins, II et al. |
| 2003/0077041 A1 | 4/2003 | Belaidi et al. |
| 2003/0103750 A1 | 6/2003 | Laporte et al. |
| 2003/0123838 A1 | 7/2003 | Wang et al. |
| 2003/0125719 A1 | 7/2003 | Furnish |
| 2003/0147597 A1 | 8/2003 | Duran |
| 2003/0223725 A1 | 12/2003 | Laporte et al. |
| 2004/0062508 A1 | 4/2004 | Blankenship et al. |
| 2004/0074852 A1 | 4/2004 | Knudsen et al. |
| 2004/0123998 A1 | 7/2004 | Berglund et al. |
| 2004/0126069 A1 | 7/2004 | Jong et al. |
| 2004/0146266 A1 | 7/2004 | Solheid et al. |
| 2004/0161217 A1 | 8/2004 | Hodge et al. |
| 2004/0211774 A1 | 10/2004 | Daoud et al. |
| 2004/0213620 A1 | 10/2004 | Bergeron et al. |
| 2004/0228589 A1 | 11/2004 | Melton et al. |
| 2004/0228598 A1 | 11/2004 | Allen et al. |
| 2004/0247265 A1 | 12/2004 | Takano et al. |
| 2004/0256138 A1 | 12/2004 | Grubish et al. |
| 2005/0002633 A1 | 1/2005 | Solheid et al. |
| 2005/0021392 A1 | 1/2005 | English et al. |
| 2005/0025444 A1 | 2/2005 | Barnes et al. |
| 2005/0053337 A1 | 3/2005 | Mayer |
| 2005/0053342 A1 | 3/2005 | Melton et al. |
| 2005/0069275 A1 | 3/2005 | Brants et al. |
| 2005/0094959 A1 | 5/2005 | Sibley et al. |
| 2005/0100301 A1 | 5/2005 | Solheid et al. |
| 2005/0105873 A1 | 5/2005 | Reagan et al. |
| 2005/0111799 A1 | 5/2005 | Cooke et al. |
| 2005/0129375 A1 | 6/2005 | Elkins, II et al. |
| 2005/0129379 A1 | 6/2005 | Reagan et al. |
| 2005/0135768 A1 | 6/2005 | Rapp et al. |
| 2005/0145522 A1 | 7/2005 | Bloodworth et al. |
| 2005/0163448 A1 | 7/2005 | Blackwell, Jr. et al. |
| 2005/0175307 A1 | 8/2005 | Battey et al. |
| 2005/0175308 A1 | 8/2005 | Elkins, II et al. |
| 2005/0185895 A1 | 8/2005 | Keenum et al. |
| 2005/0213921 A1 | 9/2005 | Mertesdorf et al. |
| 2005/0220421 A1 | 10/2005 | Keenum et al. |
| 2005/0259928 A1 | 11/2005 | Elkins, II et al. |
| 2005/0259929 A1 | 11/2005 | Elkins, II et al. |
| 2005/0271344 A1 | 12/2005 | Grubish et al. |
| 2005/0276552 A1 | 12/2005 | Cooke et al. |
| 2005/0281526 A1 | 12/2005 | Vongseng et al. |
| 2006/0008231 A1 | 1/2006 | Reagan et al. |
| 2006/0029353 A1 | 2/2006 | Bolster et al. |
| 2006/0056782 A1 | 3/2006 | Elkins, II et al. |
| 2006/0093302 A1 | 5/2006 | Solheid et al. |

(56) References Cited

U.S. PATENT DOCUMENTS

| | | | |
|---|---|---|---|
| 2006/0093303 A1 | 5/2006 | Reagan et al. | |
| 2006/0153517 A1 | 7/2006 | Reagan et al. | |
| 2006/0165366 A1 | 7/2006 | Feustel et al. | |
| 2006/0193588 A1 | 8/2006 | Mertesdorf et al. | |
| 2006/0222309 A1* | 10/2006 | Grubish et al. | 385/135 |
| 2006/0233506 A1 | 10/2006 | Noonan et al. | |
| 2006/0263029 A1 | 11/2006 | Mudd et al. | |
| 2007/0031100 A1 | 2/2007 | Garcia et al. | |
| 2007/0036488 A1 | 2/2007 | Harrison et al. | |
| 2007/0116413 A1 | 5/2007 | Cox | |
| 2007/0140642 A1 | 6/2007 | Mertesdorf et al. | |
| 2007/0165995 A1 | 7/2007 | Reagan et al. | |
| 2007/0192817 A1 | 8/2007 | Landry et al. | |
| 2007/0237484 A1 | 10/2007 | Reagan et al. | |
| 2008/0056654 A1 | 3/2008 | Bickham et al. | |
| 2008/0069511 A1 | 3/2008 | Blackwell, Jr. et al. | |
| 2008/0075411 A1 | 3/2008 | Solheid et al. | |
| 2008/0166094 A1 | 7/2008 | Bookbinder et al. | |
| 2008/0253730 A1 | 10/2008 | Cox et al. | |
| 2009/0169163 A1 | 7/2009 | Abbott, III et al. | |
| 2010/0092146 A1 | 4/2010 | Conner et al. | |
| 2011/0042529 A1 | 2/2011 | Walter | |
| 2011/0097050 A1 | 4/2011 | Blackwell, Jr. et al. | |
| 2012/0027361 A1* | 2/2012 | Brower et al. | 385/89 |
| 2013/0028568 A1 | 1/2013 | Beamon et al. | |
| 2013/0043069 A1 | 2/2013 | Okuyama | |
| 2013/0146355 A1* | 6/2013 | Strasser et al. | 174/72 A |
| 2013/0233597 A1 | 9/2013 | Suiter | |
| 2013/0259428 A1* | 10/2013 | Isenhour et al. | 385/78 |
| 2013/0294735 A1* | 11/2013 | Burris et al. | 385/101 |

FOREIGN PATENT DOCUMENTS

| | | |
|---|---|---|
| DE | 3537684 A1 | 4/1987 |
| DE | 3900021 A1 | 10/1990 |
| EP | 0110673 A1 | 6/1984 |
| EP | 0124987 A2 | 11/1984 |
| EP | 0251396 A1 | 1/1988 |
| EP | 0320189 A2 | 6/1989 |
| EP | 0320236 A2 | 6/1989 |
| EP | 0511147 A1 | 10/1992 |
| EP | 0512811 A1 | 11/1992 |
| EP | 0514174 A1 | 11/1992 |
| EP | 0620462 A1 | 10/1994 |
| EP | 0646294 A1 | 4/1995 |
| EP | 0805536 A1 | 11/1997 |
| EP | 0844504 A2 | 5/1998 |
| EP | 0851257 A1 | 7/1998 |
| EP | 0903604 A2 | 3/1999 |
| EP | 1138828 A2 | 10/2001 |
| EP | 1361465 A1 | 11/2003 |
| EP | 1380828 A1 | 1/2004 |
| EP | 1012642 B1 | 12/2007 |
| FR | 2667955 A1 | 4/1992 |
| FR | 2780209 A1 | 12/1999 |
| FR | 2853775 A1 | 10/2004 |
| GB | 1324177 A | 7/1973 |
| GB | 2087170 A | 5/1982 |
| GB | 2248729 A | 4/1992 |
| JP | 58105114 A | 6/1983 |
| JP | 60169813 A | 9/1985 |
| JP | 60169815 A | 9/1985 |
| JP | 612603 | 1/1986 |
| JP | 61220536 A | 9/1986 |
| JP | 6254204 | 3/1987 |
| JP | 6259906 | 3/1987 |
| JP | 62181903 U | 11/1987 |
| JP | 62191908 U | 12/1987 |
| JP | 63130317 | 6/1988 |
| JP | 63136007 | 6/1988 |
| JP | 63180915 | 7/1988 |
| JP | 63200105 | 8/1988 |
| JP | 63257701 | 10/1988 |
| JP | 63287916 | 11/1988 |
| JP | 63188607 | 12/1988 |
| JP | 1138828 A | 5/1989 |
| JP | 1177709 A | 7/1989 |
| JP | 1182802 A | 7/1989 |
| JP | 1225240 A | 9/1989 |
| JP | 1265211 A | 10/1989 |
| JP | 4309906 | 2/1992 |
| JP | 584902 | 11/1993 |
| JP | 6027510 A | 2/1994 |
| JP | 619387 | 3/1994 |
| JP | 6127510 A | 5/1994 |
| JP | 6181861 | 7/1994 |
| JP | 6227312 A | 8/1994 |
| JP | 6337317 | 12/1994 |
| JP | 8114724 | 5/1996 |
| JP | 915426 | 1/1997 |
| JP | 10133033 A | 5/1998 |
| JP | 11508760 | 7/1999 |
| JP | 2000241631 A | 9/2000 |
| JP | 2002207127 A | 7/2002 |
| JP | 2002233028 A | 8/2002 |
| JP | 2003057512 | 2/2003 |
| JP | 2003177254 A | 6/2003 |
| JP | 2005338436 A | 12/2005 |
| WO | 9105281 A1 | 4/1991 |
| WO | 9110927 A1 | 7/1991 |
| WO | 9326069 A1 | 12/1993 |
| WO | 9507478 A1 | 3/1995 |
| WO | 9523449 A1 | 8/1995 |
| WO | 0206879 A1 | 1/2002 |
| WO | 02093215 A2 | 11/2002 |
| WO | 2004086112 A1 | 10/2004 |
| WO | 2004095107 A1 | 11/2004 |
| WO | 2005008307 A2 | 1/2005 |
| WO | 2005050277 A2 | 6/2005 |
| WO | 2005088373 A1 | 9/2005 |
| WO | 2005119322 A1 | 12/2005 |
| WO | 2006044080 A1 | 4/2006 |
| WO | 2006050505 A1 | 5/2006 |
| WO | 2006052355 A1 | 5/2006 |
| WO | 2006076120 A1 | 7/2006 |
| WO | 2006135524 A2 | 12/2006 |
| WO | 2008118603 A2 | 10/2008 |
| WO | 2009076536 A1 | 6/2009 |
| WO | 2009089327 A2 | 7/2009 |

OTHER PUBLICATIONS

International Search Report for PCT/US10/53026 mailed Feb. 8, 2011, 3 pages.
International Search Report for PCT/US2007/12281 mailed Jul. 11, 2008, 4 pages.
International Search Report for PCT/US2008/04344 mailed Aug. 19, 2008, 3 pages.
International Search Report for PCT/US2008/10766 mailed Dec. 19, 2008, 3 pages.
International Search Report for PCT/US2009/057069 mailed Feb. 24, 2010, 2 pages.
Final Office Action for U.S. Appl. No. 12/323,373 mailed Feb. 17, 2012, 8 pages.
Notice of Allowance for U.S. Appl. No. 12/758,458 mailed Dec. 28, 2010, 8 pages.
Non-final Office Action for U.S. Appl. No. 12/758,458 mailed Sep. 3, 2010, 7 pages.
Notice of Allowance for US U.S. Appl. No. 29/264,332 mailed Sep. 3, 2008, 6 pages.
Non-final Office Action for U.S. Appl. No. 29/264,332 mailed Apr. 22, 2008, 7 pages.
Notice of Allowance for U.S. Appl. No. 11/432,570 mailed Oct. 14, 2012, 6 pages.
Advisory Action for U.S. Appl. No. 12/323,373 mailed Oct. 22, 2010, 3 pages.
Final Office Action for U.S. Appl. No. 12/323,373 mailed Aug. 6, 2010, 7 pages.
Final Office Action for U.S. Appl. No. 12/323,373 mailed May 31, 2011, 6 pages.

(56) References Cited

OTHER PUBLICATIONS

Non-final Office Action for U.S. Appl. No. 12/323,373 mailed Feb. 3, 2010, 6 pages.
Non-final Office Action for U.S. Appl. No. 12/323,373 mailed May 3, 2012, 13 pages.
Non-final Office Action for U.S. Appl. No. 13/206,157 mailed Apr. 11, 2013, 10 pages.
Final Office Action for U.S. Appl. No. 13/206,157 mailed Aug. 22, 2013, 9 pages.
Advisory Action for U.S. Appl. No. 13/206,157 mailed Nov. 12, 2013, 3 pages.
Final Office Action for U.S. Appl. No. 13/206,157 mailed Mar. 6, 2014, 10 pages.
Advisory Action for U.S. Appl. No. 13/206,157 mailed May 14, 2014, 3 pages.
Non-final Office Action for U.S. Appl. No. 13/206,157 mailed Jun. 20, 2014, 8 pages.
Non-final Office Action for U.S. Appl. No. 13/282,498 mailed Jul. 22, 2013, 9 pages.
Final Office Action for U.S. Appl. No. 13/282,498 mailed Nov. 12, 2013, 12 pages.
Notice of Allowance for U.S. Appl. No. 13/282,498 mailed Mar. 4, 2014, 8 pages.
Non-final Office Action for U.S. Appl. No. 13/456,755 mailed Jan. 3, 2014, 21 pages.
Final Office Action for U.S. Appl. No. 13/456,755 mailed Apr. 15, 2014, 24 pages.
Notice of Allowance for U.S. Appl. No. 13/456,755 mailed Jun. 26, 2014, 9 pages.
International Search Report for PCT/US2013/037785 mailed Aug. 9, 2013, 2 pages.
International Search Report for PCT/US2011/058023 mailed Feb. 14, 2012, 3 pages.
Non-final Office Action for U.S. Appl. No. 12/323,373 mailed May 31, 2011, 6 pages.
Non-final Office Action for U.S. Appl. No. 12/069,639 mailed Jun. 25, 2009, 10 pages.
Final Office Action for U.S. Appl. No. 12/069,639 mailed Jan. 28, 2009, 12 pages.
Non-final Office Action for U.S. Appl. No. 12/069,639 mailed Jul. 3, 2008, 10 pages.
Non-final Office Action for U.S. Appl. No. 11/285,130 mailed Jun. 20, 2006, 8 pages.
Final Office Action for U.S. Appl. No. 11/285,130 mailed Feb. 9, 2007, 10 pages.
Non-final Office Action for U.S. Appl. No. 12/323,373 mailed May 3, 2012, 7 pages.
Non-final Office Action for U.S. Appl. No. 11/901,800 mailed Mar. 13, 2009, 8 pages.
Non-final Office Action for U.S. Appl. No. 11/881,518 mailed Mar. 10, 2009, 7 pages.
Non-final Office Action for U.S. Appl. No. 11/804,452 mailed Nov. 13, 2008, 10 pages.
Non-final Office Action for U.S. Appl. No. 11/439,088 mailed Sep. 2, 2008, 14 pages.
Non-final Office Action for U.S. Appl. No. 11/432,570 mailed Apr. 10, 2007, 29 pages.
Non-final Office Action for U.S. Appl. No. 11/432,570 mailed Nov. 1, 2007, 23 pages.
Non-final Office Action for U.S. Appl. No. 11/432,570 mailed Aug. 19, 2008, 9 pages.
Non-final Office Action for U.S. Appl. No. 11/285,130 mailed Oct. 4, 2007, 9 pages.
Final Office Action for U.S. Appl. No. 11/285,130 mailed Jul. 9, 2008, 11 pages.
Advisory Action for U.S. Appl. No. 11/285,130 mailed Oct. 6, 2008, 3 pages.
Non-final Office Action for U.S. Appl. No. 11/285,130 mailed Jan. 23, 2009, 10 pages.
Final Office Action for U.S. Appl. No. 11/285,130 mailed Jul. 22, 2009, 11 pages.
Non-final Office Action for U.S. Appl. No. 12/082,330 mailed Jul. 25, 2008, 8 pages.
Non-final Office Action for U.S. Appl. No. 12/082,330 mailed Jan. 8, 2009, 9 pages.
Patent Cooperation Treaty, Annex to the Invitation to Pay Additional Fees, Communication Relating to the Results of the Partial International Search, International Application No. PCT/US07/012281 mailed Jul. 11, 2008, 4 pages.
Patent Cooperation Treaty, International Search Report for International Application No. PCT/US2008/004344, Aug. 19, 2008, 3 pages.
Patent Cooperation Treaty, International Search Report for International Application No. PCT/US2008/010766, Dec. 19, 2008, 3 pages.
Notice of Allowance for U.S. Appl. No. 11/804,452 mailed Oct. 6, 2009, 8 pages.
Notice of Allowance for U.S. Appl. No. 11/432,570 mailed Oct. 30, 2009, 4 pages.
Notice of Allowance for U.S. Appl. No. 11/432,570 mailed Apr. 16, 2009, 8 pages.
Supplemental Notice of Allowance for U.S. Appl. No. 11/285,130 mailed May 27, 2010, 4 pages.
Notice of Allowance for U.S. Appl. No. 11/285,130 mailed Mar. 9, 2010, 7 pages.
Notice of Allowance for U.S. Appl. No. 11/901,800 mailed Jan. 26, 2010, 8 pages.
Notice of Allowance for U.S. Appl. No. 11/901,800 mailed Sep. 25, 2009, 7 pages.
Notice of Allowance for U.S. Appl. No. 11/881,518 mailed Sep. 3, 2009, 8 pages.
Notice of Allowance for U.S. Appl. No. 11/439,088 mailed Feb. 18, 2009, 8 pages.
Notice of Allowance for U.S. Appl. No. 12/082,330 mailed Oct. 1, 2009, 6 pages.
Notice of Allowance for U.S. Appl. No. 11/804,452 mailed Jun. 10, 2009, 8 pages.
Notice of Allowance for U.S. Appl. No. 13/456,755 mailed Sep. 15, 2014, 9 pages.
Final Office Action for U.S. Appl. No. 13/206,157 mailed Oct. 29, 2014, 8 pages.

* cited by examiner

COMPOSITE CABLE BREAKOUT ASSEMBLY

RELATED APPLICATIONS

This application claims the benefit of priority under 35 U.S.C. §119 of U.S. Provisional Application Ser. No. 61/551,685 filed on Oct. 26, 2011 the content of which is relied upon and incorporated herein by reference in its entirety.

BACKGROUND

1. Field of the Disclosure

The disclosure relates generally to cable breakout assemblies and particularly to a breakout assembly for composite cable including both fiber optic cables and electrical power cables.

2. Technical Background

Minimizing the number of cables deployed for remote radio head (RRH) technology in fiber-to-the antenna (FTTA) installations reduces installation costs and monthly lease expenses for the wireless service provider (WSP). Further, minimizing the quantity and footprint of the terminal or cable break out at the tower top can further minimize monthly lease expenses while making the cable and cable assembly easy to handle. Current solutions range from bulky composite connectors to breakouts with no terminal at all.

SUMMARY

Embodiments disclosed in the detailed description include a composite cable breakout assembly. The assembly includes an enclosure for receiving a composite cable having a fiber optic cable with at least one optical fiber and an electrical power cable with at least one electrical conductor. The enclosure has at least one port providing passage to the exterior of the enclosure. The fiber optic cable and the electrical power cable route to the at least one port for optical and electrical connection to components external to the enclosure. Connection to the fiber optic cable and the electrical power cable separated from the composite cable is enabled from the exterior of the enclosure. A grounding conductor attached to a shield of the composite cable for grounding the composite cable to the composite cable breakout assembly.

The enclosure may be an enclosure of the terminal with the at least one port being through a wall of the enclosure. Additionally, the at least one port may comprise two ports, one being an optical port and one being an electrical port. A fiber optic connection adapter may be seated in the optical port and an electrical connection adapter may be seated in the electrical port. The fiber optic cable with the at least one optical fiber connects to the fiber optic connection adapter using the fiber optic connector. The electrical power cable with the at least one electrical conductor connects to the electrical connection adapter using the electrical connector.

Alternatively, the at least one optical fiber and the at least one electrical conductor are terminated by a composite optical fiber/electrical conductor connector. A composite optical fiber/electrical conductor connection adapter may be seated in the at least one port. The fiber optic cable with the at least one optical fiber and the electrical power cable with the at least one electrical conductor connect to the composite optical/fiber connection adapter using the composite fiber/electrical connector.

The enclosure may comprise a sealing material attached to the composite cable. The sealing material forms around the fiber optic cable and the electrical power cable to form the at least one port for passage to the exterior of the enclosure. The sealing material may be an epoxy, a silicone or any other suitable material or composition. A molded covering may be positioned over the sealing material.

Embodiments disclosed herein also include a composite optic/electrical terminal having an enclosure having a wall defining an interior cavity. At least one port extending through the wall of the enclosure providing passage between the interior cavity and the exterior of the enclosure. The enclosure has a cable port for receiving by the enclosure a composite cable having a fiber optic cable with at least one optical fiber and an electrical power cable with at least one electrical conductor. The fiber optic cable and the electrical power cable separate from the composite cable in the interior cavity and route through the interior cavity to the at least one port. The wall of the enclosure may have an angled surface with the at least one port positioned through the wall of the enclosure at the angled surface. Connection to the fiber optic cable and the electrical power cable separated from the composite cable is enabled from the exterior of the enclosure.

The at least one optical fiber and the at least one electrical conductor may be terminated by a composite optical fiber/electrical conductor connector. A composite optical fiber/electrical conductor connection adapter may be seated in the at least one port. The fiber optic cable with the at least one optical fiber and the electrical power cable with the at least one electrical conductor may connect to the composite optical/fiber connection adapter using the composite fiber/electrical connector.

Alternatively, the at least one optical fiber may be terminated by a fiber optic connector and the at least one electrical conductor may be terminated by an electrical connector. The at least one port may be two ports, one being an optical port and the other being an electrical port. A fiber optic connection adapter may be seated in the optical port and an electrical connection adapter may be seated in the electrical port. The fiber optic cable with the at least one optical fiber connects to the fiber optic connection adapter using the fiber optic connector. The electrical power cable with the at least one electrical conductor connects to the electrical connection adapter using the electrical connector.

Embodiments disclosed herein also include a method for breaking out fiber optic cables and electrical power cables from a composite cable. The method includes stripping back a jacket, shield and other components from the composite cable to expose a fiber optic cable and an electrical power cable. The fiber optic cable has at least one optical fiber, and the electrical power cable having at least one electrical conductor. The method also includes providing an enclosure for receiving the composite cable with the enclosure having at least one port, and routing the fiber optic cable and the electrical power cable to the at least one port. The method may also include connectorizing the end of the at least one optical fiber with a fiber optic connector, and connectorizing the end of the at least one electrical conductor. Connection to the fiber optic cable and the electrical power cable separated from the composite cable is enabled from the exterior of the enclosure.

Additional features and advantages are set out in the detailed description which follows, and in part will be readily apparent to those skilled in the art from that description or recognized by practicing the embodiments as described herein, including the detailed description, the claims, as well as the appended drawings.

It is to be understood that both the foregoing general description and the following detailed description are merely exemplary, and are intended to provide an overview or framework to understanding the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein. Rather, these embodiments are provided so that this disclosure will satisfy applicable legal requirements. Whenever possible, like reference numbers will be used to refer to like components or parts.

As used herein, the terms composite and hybrid may be used interchangeably and each shall mean the combination of fiber optic, including without limitation, optical fiber, cables, connections, and/or components, and electrical power, including, without limitation conductors, cables, connections and/or components. A composite fiber/power connector may be used in a terminal or non-terminal breakout assembly. A means to ground any metallic shielding or conductors (grounding conductors) may be provided at or near the break out assembly.

As used herein, it is intended that terms "fiber optic cables" and/or "optical fibers" include all types of single mode and multi-mode light waveguides, including one or more optical fibers that may be up-coated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

As used herein, it is intended that terms "electrical power cable" and/or "electrical conductor" include all types of cables and/or conductors used to transmit electrical power manufactured of any conductive material, including without limitation, copper and aluminum and in any form, including without limitation, multiple or individual conductors and whether jacketed, armored, and/or the like.

Figure 1:
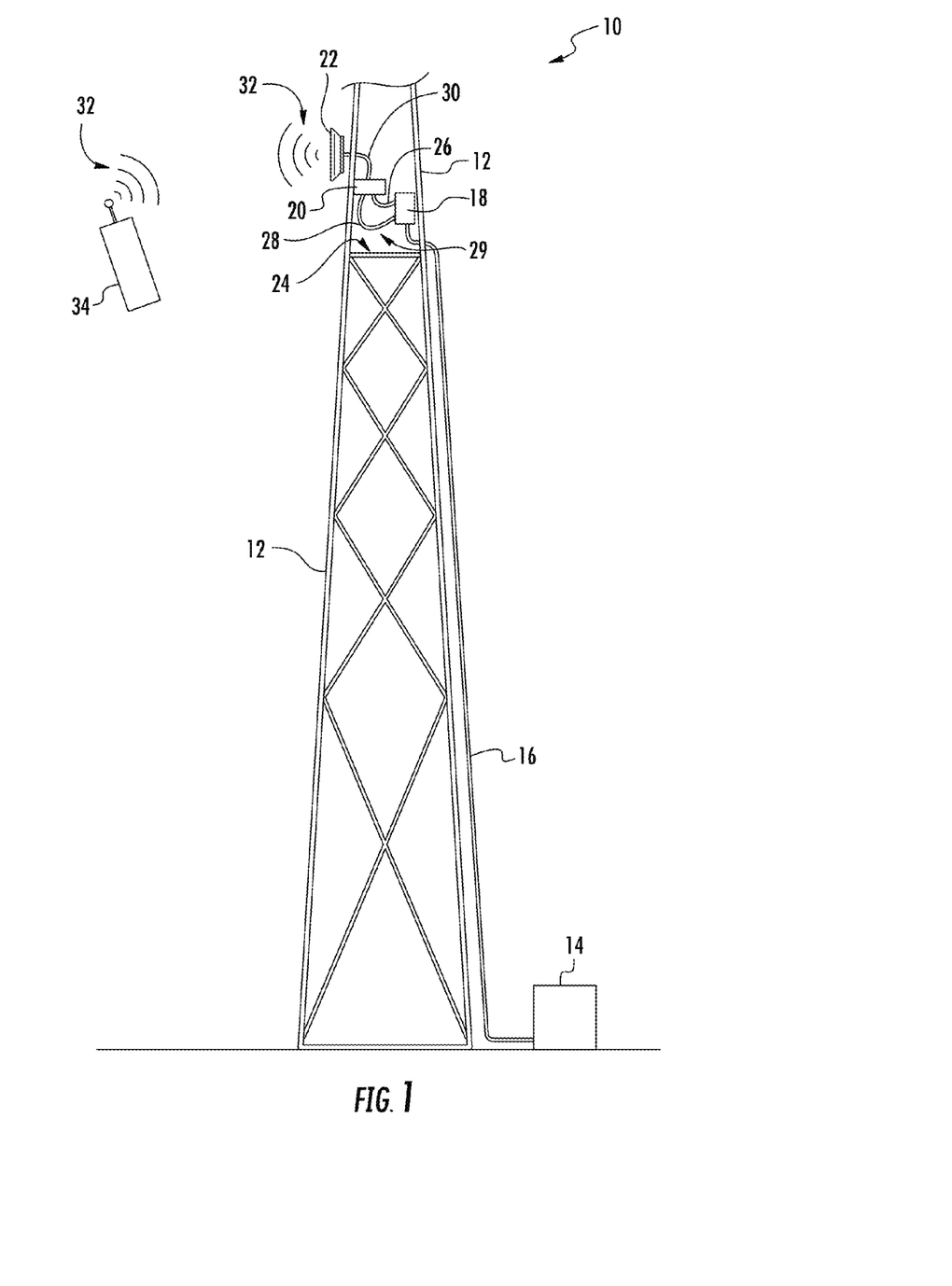
FIG. 1 is a schematic diagram of a cell site including a cell tower and base transmitter station with a composite cable, cable breakout assembly, remote radio head and antenna.

In this regard, FIG. 1 illustrates a cell tower site 10 of a WSP. The cell tower site 10 includes a tower 12, a base transceiver station (BTS) 14, a composite riser cable 16 (also referred to as a "hybrid cable"), a breakout point 18, a RRH 20, and an antenna 22. The composite cable 16 extends from the BTS 14 up the tower 12 to or near an antenna level 24. The composite cable 16 has one or more fiber optic cables 26 and one or more electrical power cables 28, and, although not shown, may have shielding. At the antenna level 24, at the breakout point 18, certain of the fiber optic cables 26 and certain of the electrical power cables 28 may separate from the composite cable 16. The fiber optic cables 26 and electrical power cables 28 may then extend to the remote radio head (RRH) 20 and be structured as a remote radio cable assembly (RRCA) 29. The electrical power cable 28 provides the electrical power necessary to operate the RRH 20. The RRH fiber optic cable 26 carries optical communication signals between the base transmitter station (BTS) 14 and the RRH 20.

The RRH 20 is electrically connected to the antenna 22 by an electrical signal cable 30. Wireless signals 32 between a user's communication device 34 and the wireless service provider (WSP) are received and transmitted by the antenna 22. The antenna 22 converts the wireless signals 32 received by the antenna 22 to electrical signals and transmits the electrical signals 32 to the RRH 20 over the electrical signal cable 30. Similarly, the antenna 20 receives electrical signals from the RRH 20, converts the electrical signals to wireless signals 32 and transmits the wireless signals 32 to the user's communication device 34. The BTS 14 converts communication signals between electrical signals and optical signals. In this way, BTS 14 converts electrical signals received from the WSP's communication network into optical signals to be carried by the fiber optic cable 26, and converts optical signals received from the RRH 20 to electrical signals to be transmitted to the WSP over the WSP's communication network.

Figure 2A:
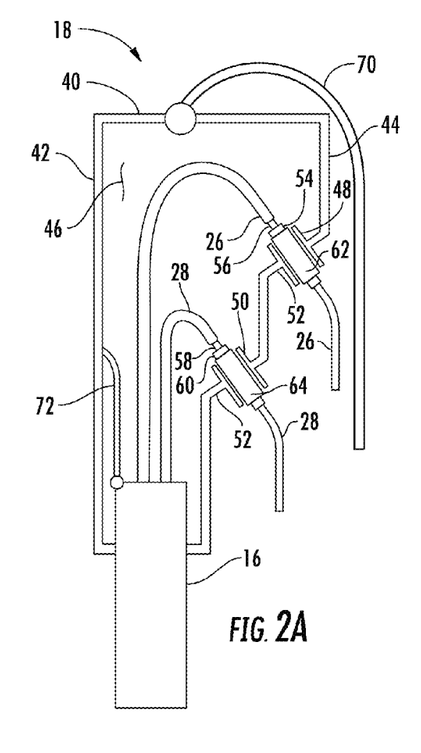
FIG. 2A is a schematic diagram of a side elevation of an exemplary embodiment of a cable breakout assembly including a terminal.
Figure 2B:
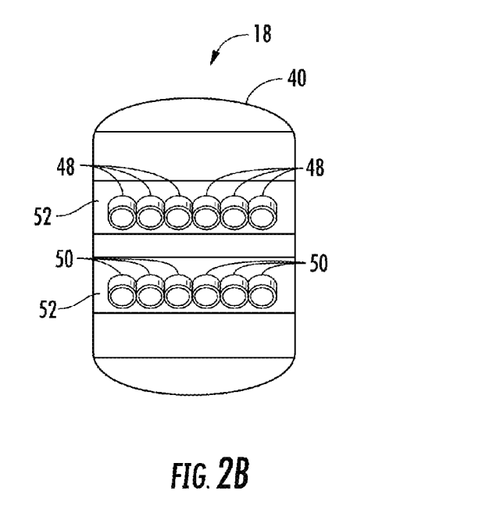
FIG. 2B is a schematic diagram of a front view of the terminal of FIG. 2A.
Figure 3:
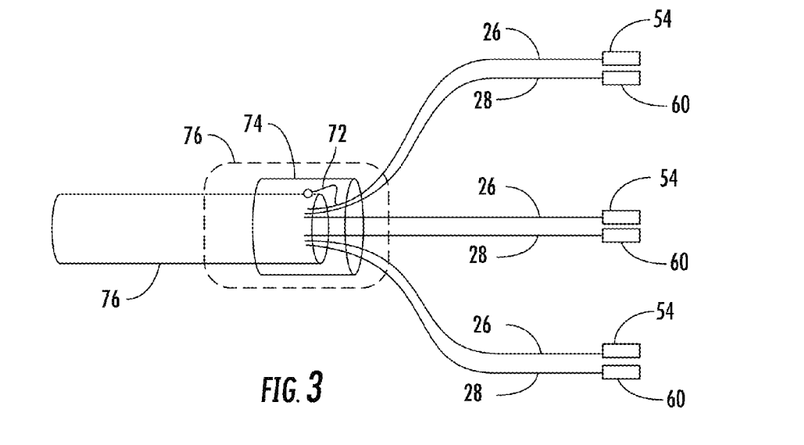
FIG. 3 is a schematic diagram of an exemplary exemplary embodiment of a cable breakout assembly using an epoxy plug with an optional molded covering.

Referring now to FIGS. 2A, 2B and 3, there are illustrated two types of breakout assembly 18. FIGS. 2A and 2B illustrate side and front elevations, respectively, of a composite optical/electrical terminal 40. The terminal 40 has an enclosure 42 with a wall 44 defining an interior cavity 46. At least one port 48, 50 extends through the wall 44 to provide passage between the interior cavity 46 and the exterior of the enclosure 42. The at least one port 47 may be one or more optical port 48 and one or more power port 50. Alternatively or additionally, the at least one port 47 may be one or more composite optical/power ports. The at least one port 47 may be positioned on an angled surface 52 of the wall 44 of the enclosure 42, which may provide a benefit as described below.

The composite cable 16 is shown entering the enclosure 42. The composite cable 16 includes one or more fiber optic cables 26 and one or more electrical power cables 28. In the interior cavity 46 the fiber optic cables 26 and electrical power cable 28 separate from the composite cable 16 and route to respective optical ports 48 and power ports 50. In FIG. 2A, two fiber optic cables 26 and two electrical power cables 28 are shown routed to their respective ports 48, 50. However, any number of fiber optic cables 26 and electrical power cables 28 may be routed to a single port. Fiber optic connection adapters 62 seat in the optical ports 48 and electrical power connection adapters 64 seat in the power ports 50. One or more optical fibers 56 in the fiber optic cable 26 may be terminated with a fiber optic connector 54 and connect to the fiber optic connection adapter 62 in the interior cavity 46 of the enclosure 42 through optical port 48. One or more electrical conductors 58 in the electrical power cable 28 may be terminated with an electrical connector 60 and connect to the electrical power connection adapter 64 in the interior cavity 46 of the enclosure 42 through electrical port 50. Alternatively, the fiber optic cable 26 may include multiple optical fibers 56, as a non-limiting example, two optical fibers 56, which may route to a single fiber optic connection adapter 62. Similarly, the electrical power cable 28 may have multiple electrical conductors 58, as a non-limiting example, two electrical conductors 58, which may route to a single electrical connection adapter 64.

The fiber optic connection adapter 62 provides for the optical fibers 26 to be optically and mechanically connected to the fiber optic cable 26, which extends externally to the enclosure 42 to the RRH 20. The fiber optic connection adapter 62 may be any suitable single fiber or multiple fiber connection adapters. As non-limiting examples, SC, LC (single and duplex), MTP or hardened connection adapters, such as OptiTap® connector adapter, for single fiber connections, or an OptiTip® fiber optic adapter for multiple fiber connections, as provided by Corning Cable Systems LLC of Hickory, N.C. The electrical connection adapter 64 provides for the electrical conductors 28 to be electrically and mechanically connected to the electrical power cable 28, which extends externally to the enclosure 42 to the RRH 20. The electrical connection adapter 64 may be any suitable device that allows for a secure connection between electrical conductors. The angled surface 52 of the wall 44 orients the direction of the connection of the fiber optic cable 26 to the fiber optic connection adapter 62 and the connection electrical power cable 28 to the electrical connection adapter 64 in a manner to facilitate the extension and routing of the fiber optic cable 26 and the electrical power cable 28 to the RRH 20 from the enclosure 42.

Alternatively or additionally, a composite optical fiber/electrical conductor connection adapter 63 may seat in the at least one port 47. In such a case, the fiber optic cable 26 with the at least one optical fiber 56 and the electrical power cable 28 with the at least one electrical conductor 58 may be terminated with a composite optical fiber/electrical conductor connector 65. The fiber optic cable 26 and the electrical power cable 28 route to the at least one port 47 where the composite optical fiber/electrical conductor connector 65 connects to composite optical fiber/electrical conductor connection adapter 63. In this manner, optical, electrical and mechanical may be established using one connector and one adapter through one port.

A protective cover 70 for the enclosure 42 may be included to provide additional protection from the elements, for example rain, and physical impact protection. A grounding conductor 72 connects to and extends from the shield of the composite cable 16 to ground the composite cable 16 to the terminal 40. As non-limiting examples, the grounding conductor 72 may connect to a grounding lug or bar, or some other suitable feature, device or manner, such that a continuous ground path is established from the composite cable 16 to the terminal 40 and to the RRH 20 and antenna 22.

Referring now to FIG. 2B, the front of the enclosure 42 with the angled surfaces 50 of the wall 44 of the enclosure 42 is illustrated. In this embodiment, the enclosure 42 has a row of six optical ports 48 and a row of six electrical ports 50. However, any number of optical ports 48 and electrical ports 50 may be used and there does not need to be any specific positioning of the optical ports 48 and electrical ports 50 or separation or segregation between the optical ports 48 and electrical ports 50. As a non-limiting example, the optical ports 48 and the electrical ports 50 may be positioned in a back to back configuration through the wall 44 on opposite sides of the enclosure 42. Also, as non-limiting examples, other configurations may be "3+3" (three optical ports 48 and three power ports 50) and "4+4" (four optical ports 48 and four power ports 50) configurations.

Referring now to FIG. 3, there is illustrated an embodiment of the breakout assembly 18 which does not include a terminal 40 with an enclosure 42 such as the one shown in the embodiments in FIGS. 2A and 2B. In FIG. 3 the composite cable 16 has both fiber optic cables 26 with optical fibers 56 and electrical power cables 28 with electrical conductors 58. The cable outer jacket/shield is stripped away to provide access to the fiber optic cables 26 and electrical power cables 28. The fiber optic cables 26 and the electrical power cables 28 extend or break-out from the composite cable 16 through a sealing material 74. The sealing material 74 may be any suitable material, including without limitation, epoxy, silicone or other composition. The sealing material 74 forms around the at least one fiber optic cable and the at least one electrical power cable forming the at least one port 75 for passage to the exterior of the sealing material 74. In this way, the sealing material 74 provides the enclosure for the breakout assembly 18.

The optical fibers 56 may be terminated with fiber optic connectors 54 and electrical power conductors 58 may be terminated with electrical connectors 60. Additionally, the breakout assembly 18 may include a molded covering 76 which is shown in a dotted line in FIG. 3. Additionally, this embodiment of the breakout assembly 18 may be positioned in some type of housing, enclosure or junction box, including, for example, by pre-connectorizing the fiber optic cables 26 and optical fibers 56 and electrical power cables 28 and electrical conductors 58. The fiber optic cables 26 and electrical power cables 28 may then be extended toward the RRH 20, either directly or using appropriate length jumpers.

Figure 4:
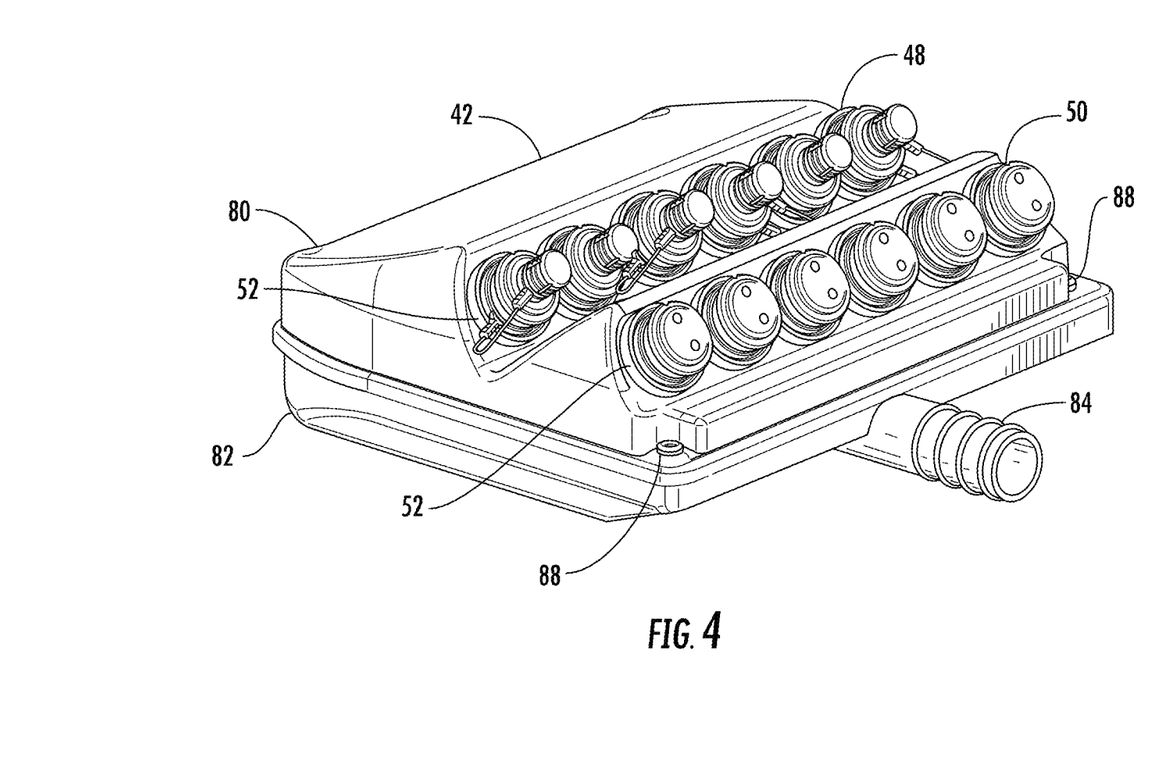
FIG. 4 is a front view of a terminal in the form of a multiport with a base and a cover.
Figure 5:
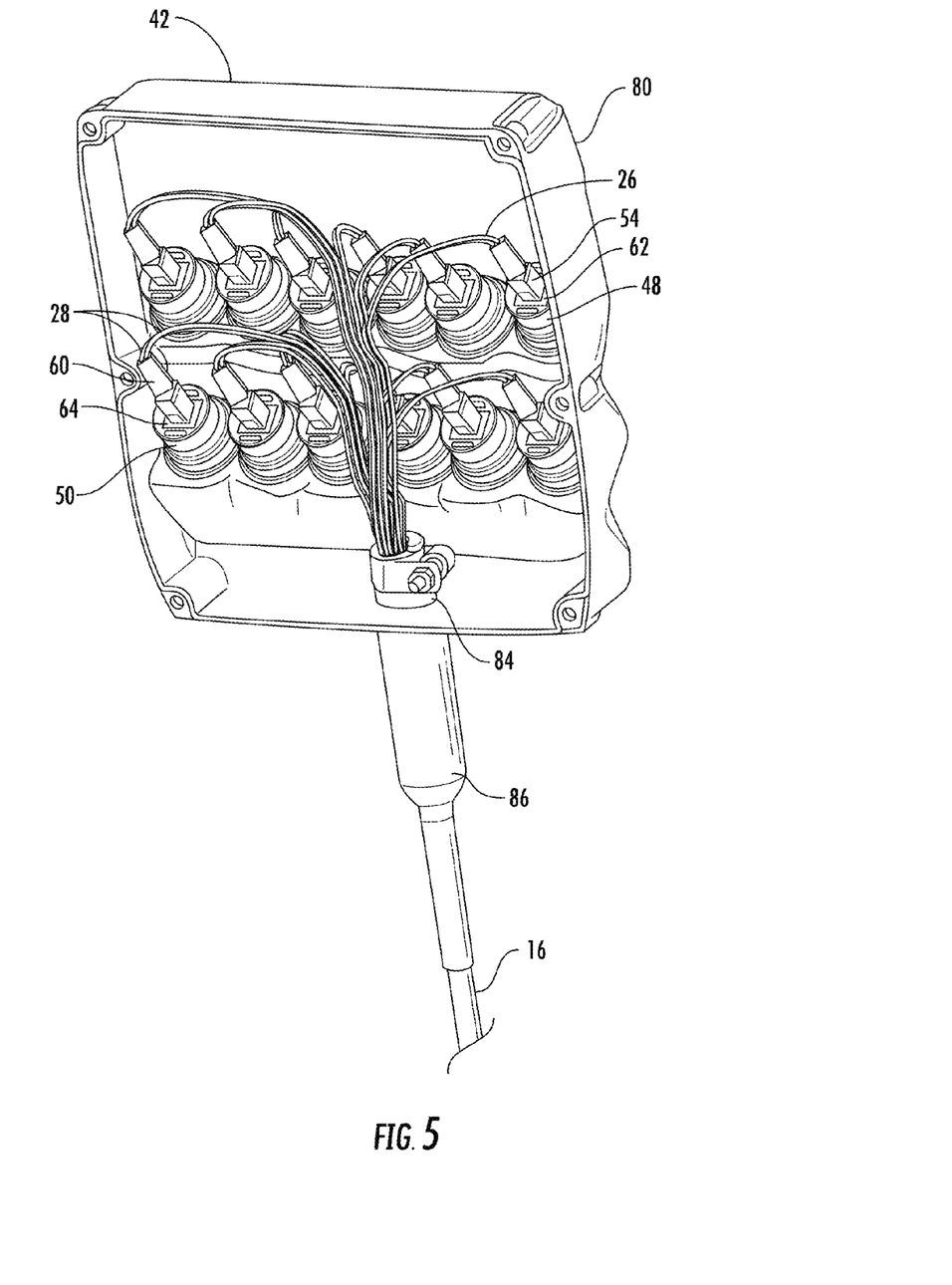
FIG. 5 is a view of the terminal of FIG. 4 with the cover removed from the base.

Referring now to FIGS. 4 and 5, there is illustrated an enclosure 42 which may be used as the terminal 40 for breakout assembly 18 as illustrated in FIGS. 2A and 2B. The enclosure 42 shown in FIGS. 4 and 5 may be, for example, a 12-port OptiSheath® Multiport Terminal provided by Corning Cable Systems LLC of Hickory, N.C. The enclosure 42 includes a wall 44 comprising a base 80 and a cover 82. FIG. 4 illustrates the enclosure 42 with the base 80 and cover 82 assembled, and FIG. 5 is a reverse perspective view from FIG. 4 illustrating the enclosure 42 with the cover 82 removed from the base 80 and showing the interior cavity 46.

The base 80 has angled surfaces 52 through which optical ports 48 and electrical ports 50 extend. The composite cable 16 may enter the enclosure 42 through cable port 84. A suitable strain relief feature 86 may be included to provide strain relief for the composite cable 16. In the interior cavity 46, the jacket and any other component of the composite cable 16 are removed to allow the individual fiber optic cables 26 with optical fibers 56 and individual electrical power cables 28 with electrical conductors 58 to separate from the composite cable 16. The fiber optic cables 26 with optical fibers 56 route to the optical ports 48. The electrical power cables 28 with electrical conductors 58 route to the power ports 50. Two fiber optic cables 26 and two electrical power cables 28 are shown routed to their respective ports 48, 50. Fiber optic connection adapters 62 seat in the optical ports 48 and electrical power connection adapters 64 seat in the power ports 50. The optical fibers 56 in the fiber optic cable 26 are terminated with a fiber optic connector 54 and connect to the fiber optic connection adapter 62 in the optical port 48. The electrical conductors 58 in the electrical power cable 28 are terminated with an electrical connector 60 and connect to the electrical power connection adapter 64 in the electrical port 50.

Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A composite cable breakout assembly, comprising:
    an enclosure for receiving a composite cable having a fiber optic cable and an electrical power cable,
    at least one port in the enclosure providing passage to the exterior of the enclosure, and
    a sealing material disposed in the at least one port and surrounding the composite cable such that the sealing material forms a seal separating an interior of the enclosure from an exterior of the enclosure;
    wherein the fiber optic cable and the electrical power cable of the composite cable received by the enclosure separate from the composite cable in the enclosure and route to the at least one port, and wherein the fiber optic cable has at least one optical fiber and the electrical power cable has at least one electrical conductor, and wherein connection to the fiber optic cable and the electrical power cable separated from the composite cable is enabled from the exterior of the enclosure.

2. The composite cable breakout assembly of claim 1, and wherein the at least one optical fiber is terminated by a fiber optic connector and wherein the at least one electrical conductor is terminated by an electrical connector.

3. The composite cable breakout assembly of claim 2, further comprising a terminal, wherein the enclosure is the enclosure of the terminal, and wherein the at least one port is through a wall of the enclosure.

4. The composite cable breakout assembly of claim 3, wherein the at least one port comprises two ports comprising an optical port and an electrical port.

5. The composite cable breakout assembly of claim 4, further comprising a fiber optic connection adapter seated in the optical port and an electrical connection adapter seated in the electrical port, and wherein the fiber optic cable with the at least one optical fiber connects to the fiber optic connection adapter using the fiber optic connector, and wherein the electrical power cable with the one electrical conductor connects to the electrical connection adapter using the electrical connector.

6. The composite cable breakout assembly of claim 1, wherein the sealing material forms around the fiber optic cable and the electrical power cable forming the at least one port for passage to the exterior of the enclosure.

7. The composite cable breakout assembly of claim 6, wherein the sealing material comprises an epoxy.

8. The composite cable breakout assembly of claim 6, wherein the sealing material comprises a silicone.

9. The composite cable breakout assembly of claim 6, further comprising a molded covering over the sealing material.

10. The composite cable breakout assembly of claim 1, wherein the at least one optical fiber and the at least one electrical conductor are terminated by a composite optical fiber/electrical conductor connector.

11. The composite cable breakout assembly of claim 10, further comprising a composite optical fiber/electrical conductor connection adapter seated in the at least one port, and wherein the fiber optic cable with the at least one optical fiber and the electrical power cable with the at least one electrical conductor connect to the composite optical/fiber connection adapter using the composite fiber/electrical connector.

12. The composite cable breakout assembly of claim 1, further comprising a ground conductor attached to a shield of the composite cable for grounding the composite cable to the composite cable breakout assembly.

13. A composite optical/electrical terminal, comprising:
    an enclosure having a wall defining an interior cavity;
    at least one port through the wall of the enclosure providing passage between the interior cavity and exterior of the enclosure;
    a cable port for receiving by the enclosure a composite cable having a fiber optic cable having at least one optical fiber, and the electrical power cable having at least one electrical conductor; and
    a sealing material disposed in the at least one cable port and surrounding the composite cable such that the sealing material forms a seal separating an interior of the enclosure from an exterior of the enclosure;
    wherein the fiber optic cable and the electrical power cable of the composite cable received by the enclosure separate from the composite cable in the interior cavity and route through the interior cavity to the at least one port, wherein connection to the fiber optic cable and the electrical power cable separated from the composite cable is enabled from the exterior of the enclosure.

14. The composite optic/electrical terminal of claim 13, wherein the at least one optical fiber and the at least one electrical conductor are terminated by a composite optical fiber/electrical conductor connector.

15. The composite optic/electrical terminal of claim 14, further comprising a composite optical fiber/electrical conductor connection adapter seated in the at least one port, and wherein the fiber optic cable with the at least one optical fiber and the electrical power cable with the at least one electrical conductor connect to the composite optical/fiber connection adapter using the composite fiber/electrical connector.

16. The composite optic/electrical terminal of claim 13, wherein the at least one optical fiber is terminated by a fiber optic connector and wherein the at least one electrical conductor is terminated by an electrical connector.

17. The composite optic/electrical terminal of claim 16, wherein the at least one port comprises two ports comprising an optical port and a electrical port.

18. The composite optic/electrical terminal of claim 17, further comprising a fiber optic connection adapter seated in the optical port and an electrical connection adapter seated in the electrical port, and wherein the fiber optic cable with the at least one optical fiber connects to the fiber optic connection adapter using the fiber optic connector, and wherein the electrical power cable with the at least one electrical conductor connects to the electrical connection adapter using the electrical connector.

19. The composite optic/electrical terminal of claim 13, wherein the wall of the enclosure comprises an angled surface, and wherein the at least one port positions through the wall of the enclosure at the angled surface.

20. A method for breaking out fiber optic cables and electrical power cables from a composite cable, comprising:
- stripping back a jacket, shield and other components from the composite cable to expose the fiber optic cable having at least one optical fiber, and the electrical power cable having at least one electrical conductor;
- providing an enclosure for receiving the composite cable, wherein the enclosure has:
  - a sealing material attached to the composite cable; and
  - at least one port; and
- routing the at least one fiber optic cable and electrical power cable to the at least one port such that the sealing material forms a seal separating an interior of the enclosure from an exterior of the enclosure, wherein connection to the fiber optic cable and the electrical power cable separated from the composite cable is enabled from the exterior of the enclosure.

21. The method of claim 20, further comprising:
connectorizing the end of the at least one optical fiber with a fiber optic connector; and
connectorizing the end of the at least one electrical conductor.

* * * * *